United States Patent [19]
Dotan

[11] Patent Number: 6,073,239
[45] Date of Patent: Jun. 6, 2000

[54] METHOD FOR PROTECTING EXECUTABLE SOFTWARE PROGRAMS AGAINST INFECTION BY SOFTWARE VIRUSES

[75] Inventor: Eyal Dotan, Bussy St. George, France

[73] Assignee: In-Defense, Inc., Santa Cruz, Calif.

[21] Appl. No.: 08/933,925

[22] Filed: Sep. 19, 1997

Related U.S. Application Data

[63] Continuation of application No. 08/579,218, Dec. 28, 1995.

[51] Int. Cl.$^7$ .............................. G06F 11/00; H04L 9/00
[52] U.S. Cl. .............................. 713/200; 380/4; 714/38
[58] Field of Search ....................... 713/200, 201, 713/202; 380/3, 4, 23, 25; 714/19, 38; 711/152, 154, 163, 164

[56] References Cited

U.S. PATENT DOCUMENTS

| | | | |
|---|---|---|---|
| 4,975,950 | 12/1990 | Lentz | 380/4 |
| 5,121,345 | 6/1992 | Lentz | 364/550 |
| 5,144,660 | 9/1992 | Rose | 380/4 |
| 5,257,381 | 10/1993 | Cook | 395/700 |
| 5,289,540 | 2/1994 | Jones | 380/4 |
| 5,319,776 | 6/1994 | Hile | 395/575 |
| 5,321,840 | 6/1994 | Ahlin | 395/700 |
| 5,349,655 | 9/1994 | Mann | 395/575 |
| 5,359,659 | 10/1994 | Rosenthal | 380/4 |
| 5,367,682 | 11/1994 | Chang | 395/700 |
| 5,396,609 | 3/1995 | Schmidt | 395/425 |
| 5,398,196 | 3/1995 | Chambers | 364/580 |
| 5,408,642 | 4/1995 | Mann | 395/575 |
| 5,421,006 | 5/1995 | Jablon et al. | 713/200 |
| 5,434,562 | 7/1995 | Reardon | 340/825 |
| 5,440,723 | 8/1995 | Arnold et al. | 380/4 |
| 5,448,668 | 9/1995 | Perelson et al. | 395/182.19 |
| 5,473,769 | 12/1995 | Cozza | 395/183.15 |
| 5,488,045 | 1/1996 | Clark | 235/382 |
| 5,488,702 | 1/1996 | Byers | 395/186 |
| 5,502,815 | 3/1996 | Cozza | 714/38 |
| 5,511,163 | 4/1996 | Lerche et al. | 395/575 |
| 5,511,184 | 4/1996 | Lin | 395/734 |
| 5,513,337 | 4/1996 | Gillespie | 395/186 X |
| 5,537,540 | 7/1996 | Miller | 395/183.14 |
| 5,559,960 | 9/1996 | Lettvin | 395/186 |
| 5,613,002 | 3/1997 | Kephart et al. | 380/4 |
| 5,822,517 | 10/1998 | Dotan | 713/200 |
| 5,826,012 | 10/1998 | Lettvin | 395/186 |

OTHER PUBLICATIONS

"Computer Viruses—An Executive Brief," Symantec Antivirus Research Center, accessed on Apr. 30, 1997 [http://www.symantec.con/avcenter/reference/corpst.html].

"Virenschutz–Programme", CHIP, No. 6, Jun. 1989, pp. 72–75.

*Primary Examiner*—Dieu-Minh T. Le
*Attorney, Agent, or Firm*—McCutchen, Doyle, Brown & Enersen, L.L.P.

[57] ABSTRACT

A method is disclosed for protecting executable computer programs against infection by a computer virus program. The invented method prevents writing operations that attempt to modify portions of the program, such as the program's entry point or first instructions. A writing operation that attempts to write data to the program is intercepted and analyzed before the operation is allowed to be processed. The method selects significant data and stores the data, in order to retain information indicative of the program prior to any modification thereof. The invented method then determines if the writing operation is attempting to modify the significant data, and if it is determined that the writing operation is attempting to modify the data, an alarm is generated and operation is denied. If it is determined that the writing operation is not attempting to modify the data, the writing operation as allowed to continue. Additionally, the program can be restored to its initial state using the stored information and data. The method of the present invention uses the stored data indicative of the significant data of the program to restore the program to its initial state and undo all the modifications that the virus may have made to the program.

9 Claims, 4 Drawing Sheets

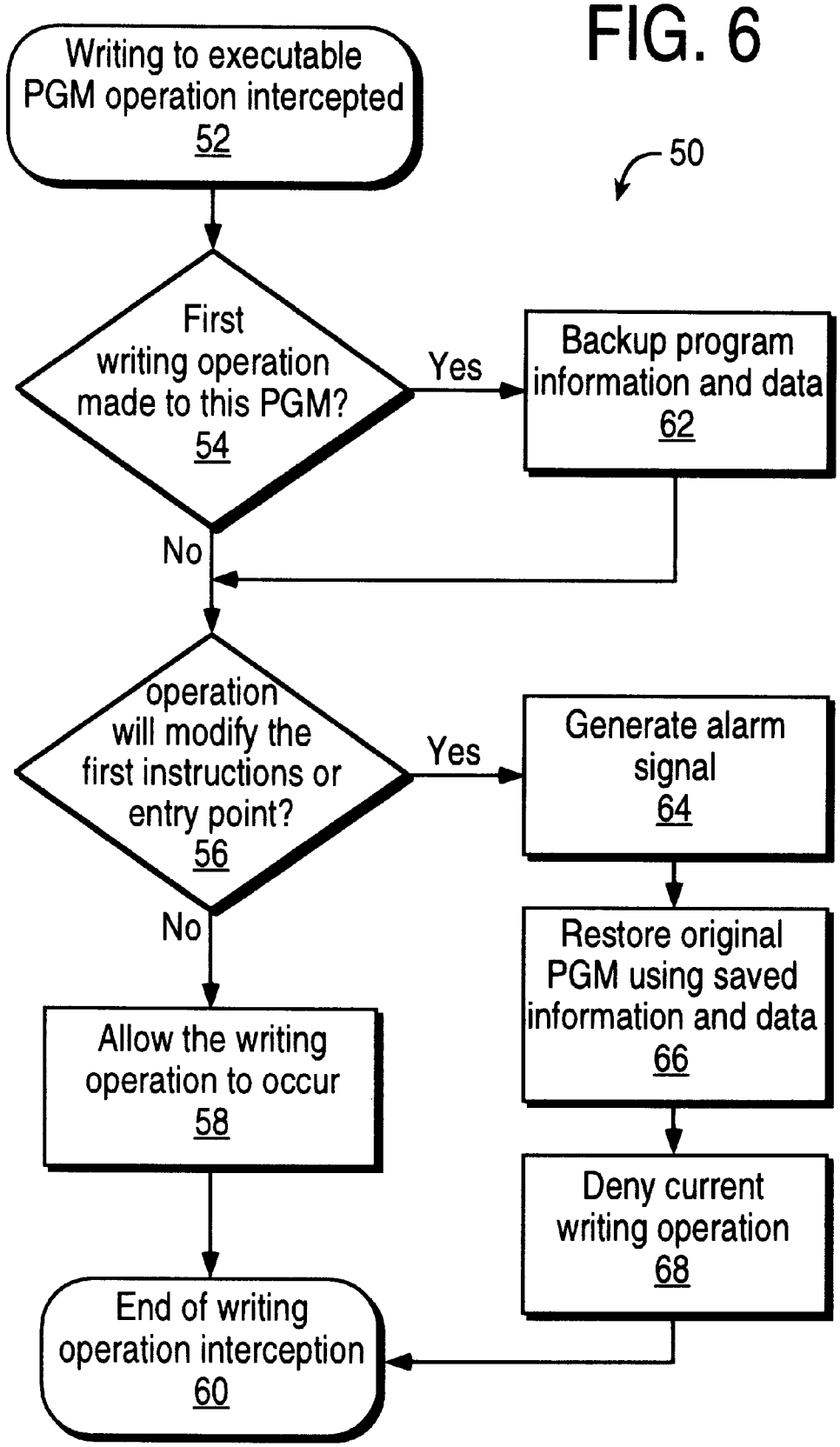

METHOD FOR PROTECTING EXECUTABLE SOFTWARE PROGRAMS AGAINST INFECTION BY SOFTWARE VIRUSES

CROSS-REFERENCE TO RELATED APPLICATIONS

This application is a continuation of U.S. application Ser. No. 08/579,218, filed Dec. 28, 1995.

BACKGROUND OF THE INVENTION

1. Field of the Invention

The present invention relates generally to computer software, and more particularly, to a method for protecting executable software programs against infection by computer software virus programs.

2. Description of Related Art

Computer software virus programs are malicious programs adapted to corrupt other executable computer software programs, such as by replicating themselves over an existing program or by adding code to the beginning or end of the program. Since their appearance, the number, performance, and intelligence of virus programs has greatly increased. The persons who write computer viruses continue to find means for making their viruses increasingly transparent and difficult to detect by a computer user.

However, the methods used by various virus programs for infecting computer programs are substantially similar. Most computer viruses replicate themselves by infecting executable programs. Executable programs typically comprise a series of instructions that are executed by a central processing unit (CPU) of a computer containing the program, when the program is invoked. The program contains a series of instructions referred to as "first instructions". These instructions are located within the program, in a location that is either fixed by a disk operating system (DOS) that the executable program is designed for, or in a location referred to as the "program entry point". The program entry point is indicated by an "entry point indicator" inside the program and may be different for each program.

The objective of computer viruses is to obtain control of a desired executable program, before normal processing of the program begins. Therefore, the virus program must have its instructions executed by the CPU, before the CPU begins processing the instructions of the executable program. For the virus to be executed before the executable program, the virus must either modify the first instructions or entry point of the program, so that the virus instructions will be processed at execution time, before the computer program is processed. Infection of the program typically comprises the virus adding its executable instructions or code to the program. The virus then causes the program to be invoked with the first instructions of the virus, instead of the program's first instructions, corrupting and possibly destroying the program.

Most viruses cannot be detected by computer users without using programs specifically designed for virus detection referred to as "anti-virus" programs. The anti-virus programs are written for detection, and possibly destruction, of viruses. The most important goal of anti-virus programs is to detect the presence of a virus in a computer system as early as possible. Once a virus is detected, the anti-virus program typically signals the user, for informing the user that a virus was detected. Since the virus often writes its code into the program at several different locations, restoring the program is a time consuming process. Further, as the virus code is in the program at different locations, it is substantially difficult to be absolutely sure that the virus code is completely removed from the program when the program is restored, without damaging the program itself.

There are systems in the prior art for protecting executable programs from infections by virus programs. One such system denies performing any writing operation on any executable program, without taking account of modified bytes of the program. This system is used by some anti-virus programs. A disadvantage to this system is that writing to an executable program is a completely legal operation, and protection systems that deny writing to an executable program typically produce false positives (wrongly identifying a legal operation or program as a virus program), rather than stopping real virus operations and programs. However, modifying an executable program's entry point or first instructions is rarely performed by normal executable programs and is often performed by virus programs.

Avoiding false positives is one of the more important functions of an anti-virus program, in order to provide a reliable program and achieve the users trust. A preferred method for detecting virus programs without making false positives, is to provide a method that generates an alarm signal only when it is confirmed that an operation is executed by a virus. However, when an operation executed by a virus is detected, the virus could have made changes and modifications to the program.

One method for recovery of a computer program infected by a computer virus is disclosed in U.S. Pat. No. 5,408,642, to Mann. The disclosed method takes a unique fingerprint of a program to be recovered, along with data relating to the beginning portion of the program, and stores the fingerprint and data at a separate location. A fingerprinted program thought to be infected by a virus is processed for generating a fingerprint of a string of data of the program. The generated fingerprint is compared to the stored fingerprint, to determine if they match. If the fingerprints do not match, a value utilized to select the string can be incremented and the comparison process repeated.

U.S. Pat. No. 5,349,655, to Mann, discloses a method for recovery of a computer program infected by a computer virus, similar to the method disclosed in U.S. Pat. No. 5,408,642, to Mann. The disclosed method includes generating strings of data prior to infection by a virus and storing the strings. Second strings of data are then generated and compared to the prior strings of data, to determine if the data has been corrupted by a virus and for recovering the data.

U.S. Pat. No. 5,359,659, to Rosenthal, is directed to a method for securing software against corruption by computer virus programs. The disclosed method includes coupling security routines capable of detecting the presence of any virus infection, or other corruption, to a program. The loading information of an executable program is modified so that upon any attempt to execute the program, the security routines will execute first and scan for viruses or other corruption. If any viruses or corruption are detected, execution of the program is aborted and a warning is displayed. If no viruses or corruption are detected, the security routines are removed from the computer's memory and the program continues normally.

U.S. Pat. No. 5,319,776, to Hile et al., discloses a method for in transit detection of computer virus with a safeguard. The disclosed method tests data in transit between a source medium and a destination medium. Each character of an incoming data stream is tested against multiple search strings representing the signatures of multiple known computer viruses. When a virus is detected, the incoming data is prevented from remaining on the destination storage medium.

U.S. Pat. No. 5,121,345, to Lentz, discloses a system and method for protecting the integrity of computer data and software from a computer virus. U.S. Pat. No. 5,367,682, to Chang, discloses data processing virus protection circuitry including a permanent memory for storing a redundant partition table.

Although the methods and systems disclosed in the above enumerated prior art references have improved features, they fail to disclose all of the advantageous features achieved by the method of the present invention.

OBJECTS OF THE INVENTION

It is therefore an object of the present invention to provide an improved method for protecting an executable computer program against infection by a computer virus program;

It is another object of the present invention to provide a method for protecting executable programs against infection by a computer virus that has a low probability of generating false positive recognition of a computer virus;

It is a further object of the present invention to provide a method for protecting executable programs against infection by viruses that detects virus infection actions made on executable programs;

It is another object of the present invention to provide a method for protecting an executable program against infection by a virus that does not require any modification of the executable program;

It is a still further object of the present invention to provide a method for protecting executable programs against infection by viruses that does not require a database of known computer virus programs;

It is yet another object of the present invention to provide a method for protecting executable programs against infection by viruses that automatically detects executable program infections, without the need for checking each executable program contained in a computer system;

It is a further object of the present invention to provide a method for protecting executable programs against infection by viruses that signals a user when a virus attempts to start spreading itself through the computer system; and It is still another object of the present invention to provide a method for protecting executable programs against infection by viruses that is capable of restoring executable programs upon detection and denial of a suspected virus operation.

SUMMARY OF THE INVENTION

These and other objects and advantages of the present invention are achieved by providing an improved method for protecting an executable computer program against infection by a computer virus program.

Executable programs comprise a series of instructions that are executed by a central processing unit (CPU) of a computer system containing the program, when the program is invoked. The program contains a series of first instructions that are located within the program, at a location that is either fixed by a disk operating system (DOS) or in the program entry point. The program entry point is indicated by an entry point indicator inside the program.

The method of the present invention comprises denying writing operations that attempt to modify either the executable program's entry point or first instructions. Any writing operation that intends to write data to a program is first intercepted, then analyzed before the operation is allowed to be processed.

Before an executable program is initially modified, the method of the present invention selects significant portions of the program's information and data, and stores the information and data in a desired memory location, such as on a magnetic hard disk for example, in order to retain information indicative of the program, prior to any modification thereof. The invented method then determines if a writing operation is attempting to modify the significant portions, such as the entry point indicator or the first instructions, of the program. If it is determined that the writing operation is attempting to modify these portions, the method generates an alarm and the writing operation is denied. If it is determined that the writing operation is not attempting to modify these portions, the writing operation is allowed to continue.

Additionally, the program is restored to its initial state using the stored information and data. Storing portions of the significant data of the program, such as the program size and entry point or first instructions, before any modification to the program is made is an important feature of the invented method. When a virus is detected, while trying to modify the first instructions or entry point of a program, it is possible that by the time that the virus is detected, the virus may have overwritten a portion of the program. The virus may modify the program's header or made other modifications to the program. The method of the present invention uses the data indicative of the stored portions of the program to restore the program to its initial state and undo the modifications that the virus may have been made to the program.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 6 is a flow diagram of the method of the preferred embodiment of the present invention.

DESCRIPTION OF THE PREFERRED EMBODIMENTS

The following description is provided to enable any person skilled in the art to make and use the invention and sets forth the best modes contemplated by the inventor of carrying out the invention. Various modifications, however, will remain readily apparent to those skilled in the art, since the generic principles of the present invention have been defined herein. Further, while the following discussion is directed to a single occurrence of implementing the method of the present invention on a single executable computer program, it is to be understood that the method may be used with several different executable programs on a storage medium.

Figure 1:
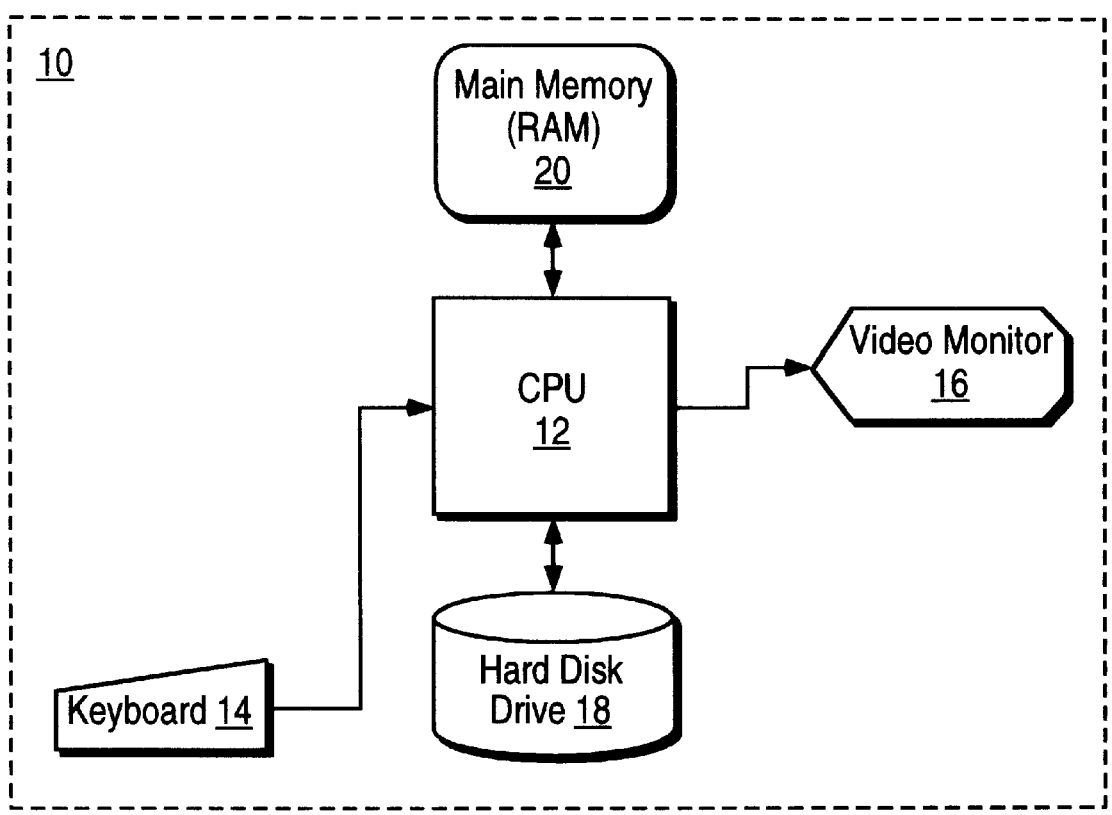
FIG. 1 is a schematic representation of a computer system for implementation of the present invention.

Referring now to FIG. 1 of the drawings, there is shown a schematic representation of a computer system 10 for implementation of the method of the present invention. The computer system 10 typically comprises a central processing unit (CPU) 12 for processing data, an input means such as a keyboard 14 for data processing, and an output means such as a video monitor 16 so that a user can view data being processed by the CPU 12. The computer system 10 is further provided with a known magnetic storage medium 18, such as a hard disk drive.

For data processing, the user typically calls an executable computer program (to be discussed thoroughly hereafter) stored on the hard disk 18 into a memory location 20, such as a well known random access memory (RAM). The user then utilizes the program to process data. After processing, the program is closed and stored on the hard disk 18. Any data that is processed using the program may also be stored on the hard disk 18, or the data may be stored on a floppy diskette (not shown).

Figure 2A:
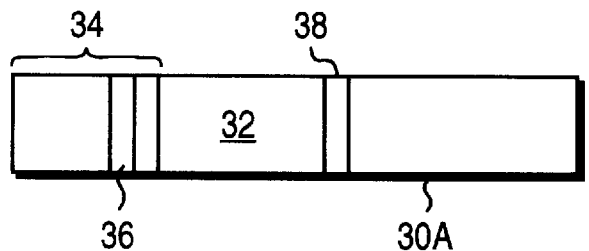
FIGS. 2A–2C are block diagrams illustrating different types of executable programs.
Figure 2B:
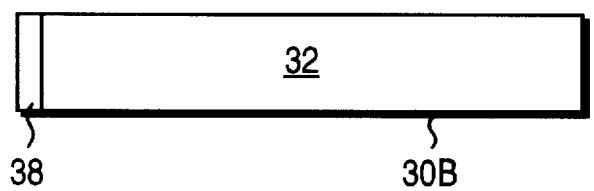
Figure 2C:
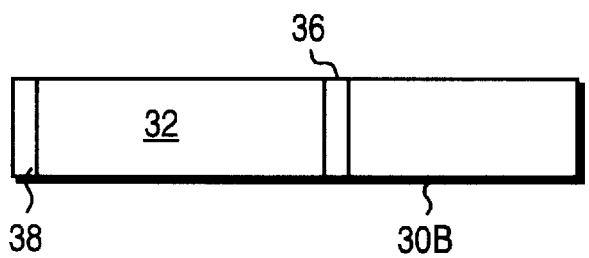

Referring now to FIGS. 2A–2C of the drawings, there are shown a plurality of executable programs 30A, 30B, 30C, as is well known in the art. Executable programs 30 typically comprise a series of instructions or code 32 that are executed by the computer's CPU 12, when the program 30 is called into the memory 20. FIG. 2A shows a first type of program 30A wherein the initial code 32 comprises a header portion 34. The header 34 contains specific information regarding the program 30A, such as program loading information and an entry point indicator 36. The entry point indicator 36 points out the location in the program 30A of the program's first instructions 38. The program code 32 is generally substantially larger than the header portion 34 of the program 30A. This type of program 30A is commonly found in programs designed to function in an MS-DOS (Microsoft-Disk Operating System, registered trademark of Microsoft Corporation) operating system. Such a program usually is provided with an "EXE" suffix, to indicate to a user that the program 30A can be executed by the user.

FIGS. 2B and 2C show a second type of executable program 30B that is not provided with a header 34 or an entry point indicator 36. The first instructions 38 of the program 30B, shown in FIG. 2B are located at position 0 or the first line of code 32 of the program 30B. The second type of program 30B is commonly found in programs that are designated with a "COM" suffix and are designed to function in the MS-DOS operating system. If the first instruction 38 of the program 30B is a "JUMP" or "CALL" instruction, that instructs the CPU 12 to process code 32 located elsewhere in the program 30B, then the location pointed to by the JUMP or CALL instruction is considered the program entry point 36. In this instance, the instructions pointed to by this JUMP or CALL instruction are considered to be the program's first instructions 38, though they are not actually the program's first instructions.

Figure 3A:
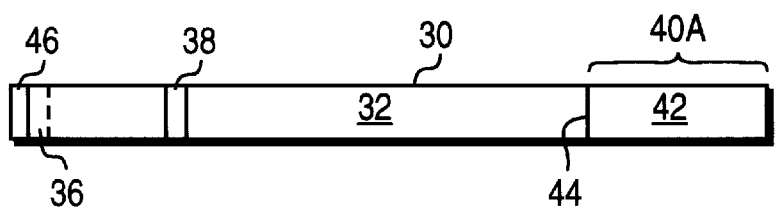
FIGS. 3A and 3B are block diagrams illustrating an executable program infected by a computer virus program.
Figure 3B:
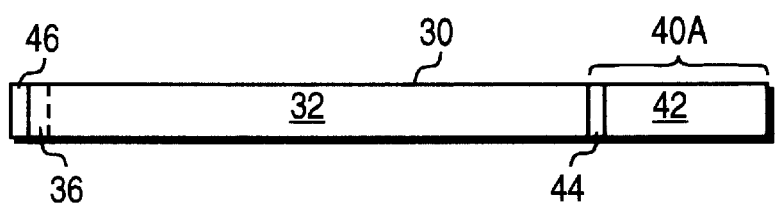

Referring now to FIGS. 3A–3B, the objective of computer virus programs is to obtain control of the executable program 30, before normal processing of the program 30 begins. Infection of the program 30 typically comprises a virus program 40A adding its executable instructions or code 42 to the program 30. The virus 40A then causes the program 30 to be invoked with the virus instructions 42, instead of the programs first instructions 38, corrupting and possibly destroying the program 30. Therefore, the virus program 40A must have its instructions 42 executed by the CPU 12, before the CPU 12 begins processing the program's code 32. For the virus 40A to be executed before the program 30, the virus 40A must either modify the first instructions 38, or entry point 36, of the program 30, so that the code 42 of the virus 40A will be processed prior to the program 30 being processed.

The virus program 40A is attempting to infect the program 30 by attaching its code 42 to an end 44 of the program 30. The virus 40A also attempts to modify the entry point indicator 36 of the program 30 by overwriting the beginning of the program 30, and thus the entry point indicator 36, with its own entry point indicator 46. Therefore, the virus code 42 becomes the first instructions of the program 30, instead of the program's first instructions 38.

Figure 4A:
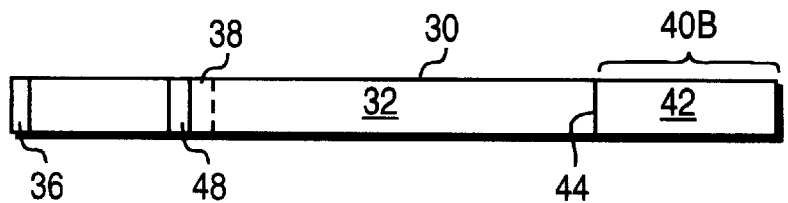
FIGS. 4A and 4B are block diagrams illustrating an executable program infected by a computer virus program.
Figure 4B:
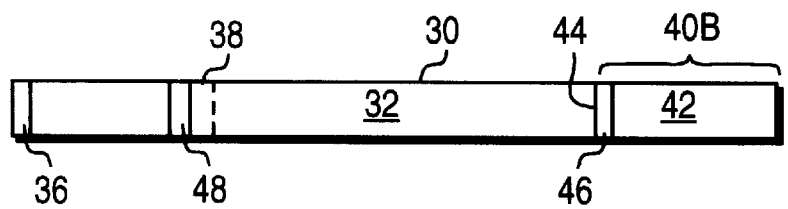

FIGS. 4A–4B show a second type of virus program 40B. The second type of virus 40B attempts to infect the program 30 by attaching its code 42 to the end 44 of the program 30. However, the virus 40B does not attempt to modify the entry point indicator 36 of the program 30, it attempts to modify the program's first instructions 38. The virus 40B typically places a JUMP instruction 48 overwriting the first instructions 38 of the program 30 that instructs the CPU 12 to process the virus code 42.

Figure 5A:
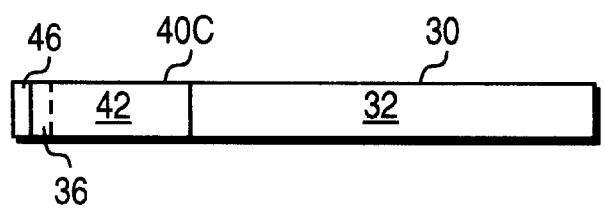
FIGS. 5A and 5B are block diagrams illustrating an executable program infected by a computer virus program.
Figure 5B:
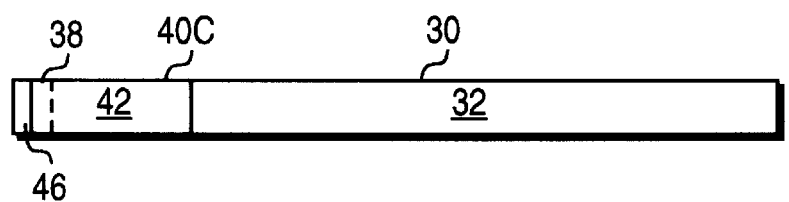

FIGS. 5A–5B show a third type of virus program 40C. The third type of virus 40C attempts to infect the program 30 by overwriting the first portion of the program 30, such as the header 34 (shown in FIG. 2A) and additional code 32, with its own code 42 and first instructions 46. Since the entry point indicator 36 is located at the beginning of the program 30, the entry point indicator 36 or any first instructions 38 are overwritten. The virus 40C further displaces the rest of the program code 32 forward and writes back the portion of the program code 32 it overwrote after the virus code 42 and before the displaced program code 32, so that the program 30 remains intact and can function.

Referring now to FIG. 6 of the drawings, there is shown a flow diagram 50 of the method of the preferred embodiment of the present invention. It is to be understood, that the invented method may comprise a computer software program or other suitable means for implementing the present invention in the computer system 10, or other appropriate device.

An attempt to write to an executable program 30 is detected by the invented method as shown in block 52. In decision block 54 it is determined if an attempt to write new data to the program 30 is the first such writing attempt made. If it is not the first attempt to write new data to the program 30, then the process continues to decision block 56. At decision block 56 it is determined whether the write attempt will write new data over the entry point indicator 36 or first instructions 38 of the program 30, thus modifying either the indicator 36 or instructions 38, or possibly both. If it is determined that the indicator 36 and instructions 38 will not be modified, then at process block 58 the write data attempt is allowed to write the new data to the program 30, after which the method of the present invention terminates at block 60.

Returning to decision block 54, if it is determined that the attempt to write new data to the program 30 is the first such attempt, then the preferred method proceeds to process block 62. At process block 62 predetermined data that contains important information regarding the program 30, such as the program entry point 36, first instructions 38, or size of the program 30, as well as any other desired data, or predetermined combinations thereof, is read from the program 30 and written to a different desired storage location. The storage location may be a different location on the hard disk 18 other than the program location, or a completely separate storage means, such as a floppy diskette for example (not shown).

After the predetermined data is properly stored, the method continues to decision block 56. If it is determined at decision block 56 that the write attempt will write new data over the entry point indicator 36 or first instructions 38, or possibly both, of the program 30, an alarm signal is generated at process block 64. The alarm signal is generated to inform the user of the program 30 that a virus program 40 may be attempting to corrupt the program 30. Preferably, the method allows the user to determine whether to prevent the write data attempt from writing the new data to the program 30, or to allow the write data attempt to write the new data to the program 30.

Once the alarm is generated, the method continues to process block 66 where the program 30 is restored. The program 30 is restored by reading the predetermined data of the program 30 on which the write data attempt was made from the second storage medium and writing the data to the program 30. The program 30 is further truncated to the representative size of the program 30, using information contained in the predetermined data. The method continues to process block 68 where the write data attempt is denied for preventing the writing new data to the program. Additionally, the present invention can prevent all further attempts at writing new data to the program 30 at process block 68. The method then continues to block 60 where the method of the present invention terminates.

Thus, there has been described an improved method for protecting an executable computer program against infection by a computer virus program. While the preferred embodiment of the present invention has been disclosed herein, certain changes and modifications will readily occur to those skilled in the art. For example, although only one entry point indicator per program is discussed, several entry point indicators can be considered, starting with a number such as 1, and incrementing this value as long as the last entry point indicator found points on a JUMP or CALL instruction. Furthermore, although the preferred embodiment generates an alarm if there is an attempt to modify the entry point or first instructions of the executable program, the alarm may be generated only if the number of the modified bytes of data doesn't exceed a predetermined value. Additionally, although the entry point and first instructions modifications are denied, the method of the present invention is capable of restoring the program after the entry point and first instructions are modified. Also, the present invention has been described in conjunction with a program for a microprocessor of the computer system, it is obvious that dedicated hardware circuitry could be provided within the computer to perform the invented method.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. In a computer system that includes input means, output means, processing means, and a storage medium, the storage medium having one or more executable computer programs stored thereon, each of the programs adapted for processing by the processing means and having a representative size, a method for protecting an executable program against infection by a computer virus program prior to the virus being able to redirect execution of the executable program, the method comprising the steps of:

determining if an attempt to write new data to a desired one of the executable programs is made;

if an attempt to write new data over predetermined detection data indicative of viral infection of the program is determined, then, reading predetermined detection data from the program, the predetermined detection data including information regarding a program entry point of the program, first instructions of the program, representative size of the program, or combinations thereof, writing the predetermined detection data to a second storage medium prior to the program being initially modified by the write attempt, generating an alarm signal to alert a user of the write data attempt, reading the predetermined detection data from the second storage medium and writing the data to the program for restoring the program, truncating the program to the representative size using information contained in the predetermined detection data for restoring the program; and if it is determined that the attempt to write new data to the program is not writing the new data over predetermined detection data, then allowing the write data attempt to write the new data to the program.

2. The method of claim 1 wherein the predetermined detection data of the executable program is read from the program and written to the second storage medium upon an initial attempt to write new data to the program.

3. The method of claim 1 wherein the predetermined detection data of the executable program is read from the program and written to the second storage medium upon initially invoking the program.

4. The method of claim 1 comprising the further step of:

upon determining that an attempt to write new data over predetermined detection data of the executable program has occurred, querying a user of the program for allowing the user to determine whether to prevent the write data attempt from writing the new data to the program or to allow the write data attempt to write the new data to the program.

5. The method of claim 1 comprising the further step of:

upon determining that an attempt to write new data over predetermined detection data of the program has occurred and the write data attempt is prevented from writing data to the program, then preventing all further attempts at writing new data to the executable program.

6. In a computer system that includes input means, output means, processing means, and a storage medium, the storage medium having one or more executable computer programs stored thereon, each of the programs adapted for processing by the processing means and having a representative size, a method for protecting an executable computer program against infection by a computer virus program prior to the virus being able to redirect execution of the executable program, the method comprising the steps of:

determining if an attempt to write new data to a desired one of the executable programs is made;

if an attempt to write new data the desired program is made, then determining if the attempt is a first one of such attempts;

if an attempt to write new data to the program is the first one of such attempts then, reading predetermined detection data indicative of viral infection from the program, the predetermined detection data containing information regarding a program entry point, first instructions of the program, representative size of the program, or combinations thereof;

writing the predetermined detection data to a second storage medium prior to the program being initially modified by the write attempt;

determining if the write attempt is attempting to write new data over predetermined detection data of the program;

if the write attempt is attempting to write new data over predetermined detection data of the program then;
  generating an alarm signal to alert a user of the write attempt;
  reading the predetermined detection data from the second storage medium and writing the data to the program for restoring the program;
  truncating the program to the representative size using information contained in the predetermined detection data for restoring the program; if an attempt to write new data to the program is not the first such attempt then;
  determining if the write attempt is attempting to write new data over predetermined detection data of the program;

if the write attempt is not attempting to write new data over predetermined detection data, then allowing the write data attempt to write the new data to the program;

if the write attempt is attempting to write new data over predetermined detection data of the program then;
  generating an alarm signal to alert a user of the write data attempt; and
  reading the predetermined detection data from the second storage medium and writing the data to the program for restoring the program and truncating the program to the representative size using information contained in the predetermined detection data for restoring the program.

7. The method of claim 6 comprising the further step of:

upon determining that an attempt to write new data over predetermined detection data of the executable program has occurred, querying a user of the program for allowing the user to determine whether to prevent the write data attempt from writing the new data to the program or to allow the write data attempt to write the new data to the program.

8. The method of claim 6 comprising the further step of:

upon determining that an attempt to write new data over predetermined detection data of the program has occurred and the write data attempt is prevented from writing data to the program, then preventing all further attempts at writing new data to the executable program.

9. The method of claim 6 wherein the storage medium and the second storage medium comprise a single magnetic hard disk drive.

* * * * *